United States Patent
Nagal et al.

(10) Patent No.: US 10,824,544 B1
(45) Date of Patent: Nov. 3, 2020

(54) GENERATING TEST DATA AS A SERVICE FOR USE IN TESTING SOFTWARE DURING SOFTWARE DEVELOPMENT

(71) Applicants: Sumit Nagal, San Ramon, CA (US); Akhilesh Jonnavittula, Sunnyvale, CA (US); Bhagyashri Mahule, Mountain View, CA (US); Vijay Thomas, Mountain View, CA (US); Garry Bullock, Mountain View, CA (US); Connor Mcauliffe, Mountain View, CA (US)

(72) Inventors: Sumit Nagal, San Ramon, CA (US); Akhilesh Jonnavittula, Sunnyvale, CA (US); Bhagyashri Mahule, Mountain View, CA (US); Vijay Thomas, Mountain View, CA (US); Garry Bullock, Mountain View, CA (US); Connor Mcauliffe, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 27 days.

(21) Appl. No.: 16/203,034

(22) Filed: Nov. 28, 2018

(51) Int. Cl.
   *G06F 11/36* (2006.01)
   *G06F 9/48* (2006.01)
   *G06Q 40/02* (2012.01)
   *G06F 16/24* (2019.01)

(52) U.S. Cl.
   CPC ........ *G06F 11/3684* (2013.01); *G06F 9/4843* (2013.01); *G06F 11/3688* (2013.01); *G06F 16/24* (2019.01); *G06Q 40/02* (2013.01)

(58) Field of Classification Search
   None
   See application file for complete search history.

(56) References Cited

U.S. PATENT DOCUMENTS

| | | | |
|---|---|---|---|
| 2001/0034866 A1* | 10/2001 | Barry | G01R 31/31813 714/734 |
| 2009/0300585 A1* | 12/2009 | Meenakshisundaram | G06F 11/3664 717/124 |
| 2012/0173663 A1* | 7/2012 | Kammerer | H04L 63/0407 709/217 |
| 2015/0095917 A1* | 4/2015 | Challenger | G06F 9/4843 718/104 |

(Continued)

*Primary Examiner* — Daxin Wu
(74) *Attorney, Agent, or Firm* — Ferguson Braswell Fraser Kubasta PC

(57) ABSTRACT

A system in an enterprise environment. A testing data service (TDS) is in communication with the storage device. The TDS receives and transmits a request for a data structure with a data combination arranged in a format specified in the request. The TDS also receives a generated data structure having the type of data structure and a generated data combination of the type of data. The system also includes an orchestration layer, in communication with the TDS. The orchestration layer includes a query engine that receives the request from the TDS. The orchestration layer also includes a data structure generator that builds the generated data structure to have the type of data structure and to populate the generated data structure with the data combination of the type of data received from the query engine. The orchestration layer is further configured to transmit the generated data structure to the TDS.

24 Claims, 6 Drawing Sheets

(56) References Cited

U.S. PATENT DOCUMENTS

2015/0186236 A1* 7/2015 Chandrasekharapuram ................ G06F 11/263
  714/33
2016/0147642 A1* 5/2016 Haeuptle ............. G06F 11/3684
  717/124

* cited by examiner

GENERATING TEST DATA AS A SERVICE FOR USE IN TESTING SOFTWARE DURING SOFTWARE DEVELOPMENT

BACKGROUND

Software development, especially for use as in Web-based services, has been increasingly important in modern economies. However, before software can be released for use, the software should be tested using test data. The process of finding appropriate test data to use for a new software program is a difficult, manual process.

SUMMARY

One or more embodiments provide for a system. The system includes a storage device configured to store a plurality of domain data repositories across an enterprise environment. The system also includes a testing data service, in communication with the storage device. The testing data service is configured to receive, from a remote computer in the enterprise environment, a request for a data structure comprising a data combination arranged in a format specified in the request. The testing data service is also configured to transmit the request. The testing data service is also configured to receive a generated data structure comprising the type of data structure and further comprising a generated data combination of the type of data. The testing data service is also configured to transmit the generated data structure to the remote computer. The system also includes an orchestration layer, in communication with the testing data service. The orchestration layer includes a query engine configured to receive the request from the testing data service. The orchestration layer also includes a data structure generator configured to build the generated data structure to have the type of data structure and to populate the generated data structure with the data combination of the type of data received from the query engine. The orchestration layer is further configured to transmit the generated data structure to the testing data service.

One or more embodiments also include a method executed in an enterprise environment including a plurality of networked computers. The method includes receiving a request for a data structure comprising a data combination arranged in a format specified in the request, the request identifying a type of the data structure and a type of the data combination. The method also includes coordinating the request with a plurality of additional requests, in the enterprise environment, for a plurality of additional data structures. Coordinating includes scheduling building of the data structure in a thread pool that schedules creation of the data structure and the plurality of additional data structures in the enterprise environment. The method also includes querying a data repository for the type of the data combination. The method also includes receiving, in response to querying, returned data comprising the data combination. The method also includes populating the data structure with the returned data. The method also includes returning the returned data structure. The method also includes testing, using the returned data structure, a computerized service.

One or more embodiments also provide for a non-transitory computer readable medium comprising instructions which, when executed by a computer processor, perform operations. The operations include receiving a request for a data structure comprising a data combination arranged in a format specified in the request, the request comprising a hashcode identifying a type of the data structure and a type of the data combination. The operations also include responsive to the hashcode failing to match a pre-defined code, building the data structure to have the type of the data structure specified in the request. The operations also include querying a data repository for the type of the data combination. The operations also include receiving, in response to querying, returned data comprising the data combination. The operations also include populating the data structure with the returned data. The operations also include returning the returned data structure.

The operations also include testing, using the returned data structure, a computerized service.

Other aspects of the invention will be apparent from the following description and the appended claims.

DETAILED DESCRIPTION

Figure 1A:
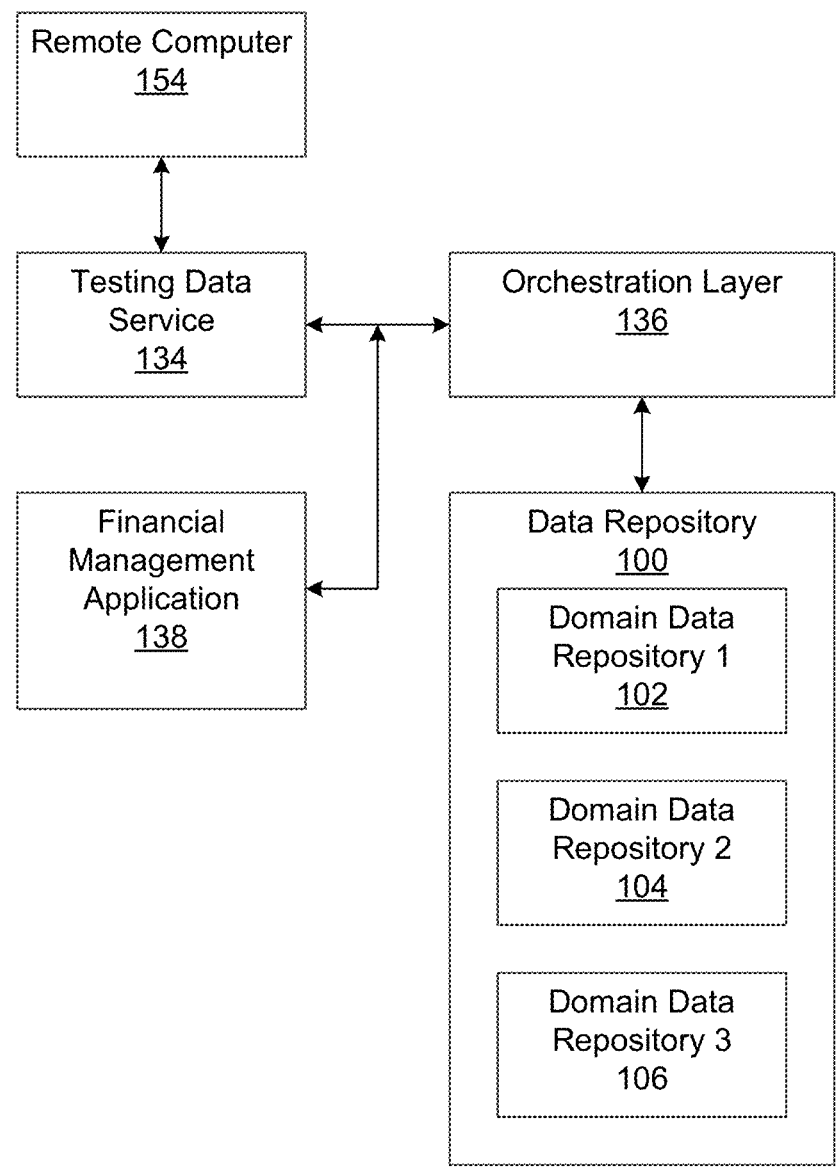
FIG. 1A and FIG. 1B depict schematic system diagrams, in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Further, although the description includes a discussion of various embodiments of the invention, the various disclosed embodiments may be combined in virtually any manner. All combinations are contemplated herein.

In general, embodiments of the invention are directed to using computers to automatically generate test data as a service for use in testing software during software development. Identifying test data to be used for testing software in an enterprise environment is difficult, particularly for a large-scale enterprise in which a multitude of software services running on a variety of computing resources (physical, virtually, or in the cloud) access vast sources of data. Previously, in order to test an enterprise service under development, test data was found and retrieved manually by the programmer. The traditional testing process represents an inefficient use of time and resources for both computers and human developers. As described herein a "testing data service" provides for seamless provisioning and scheduling of test data in a desired format. The test data service may automatically coordinate the retrieval of test data, as well as schedule and provide the desired test data. Both the retrieved data, and the format of the retrieved data, are automatically tailored to the software service under development or modification for the particular computing resource(s) being used. Thus, in one aspect, one or more embodiments provide a technical solution which uses computing resources to improve the speed of software development (and specifically testing) in a large-scale enterprise environment.

The one or more embodiments have other technical benefits. For example, embodiments provide for instructing a computer how to obtain the correct type and format of data for testing a newly-developed software program for use in a large enterprise environment. In another example, the one or more embodiments provide for instructing a computer how to obtain test data in the correct format when test data would ordinary be unavailable to the software developer due to computer information security in an enterprise environment. In still another example, the one or more embodiments provide for instructing a computer how to coordinate provisioning of test data for many different software developers at once in a distributed computing environment. In yet another example, the one or more embodiments increase the speed at which computers in a distributed environment communicate and process information by providing a platform for generating test data as a service. Other technical uses as well as advantages and benefits of the one or more embodiments are described throughout the disclosure.

FIG. 1A is a schematic diagram of a system architecture including a testing data service (134), in accordance with one or more embodiments. The system architecture shown in FIG. 1A is a brief overview of the one or more embodiments. Further descriptions of the testing data service (134) and the system architecture are provided with respect to FIG. 1B and FIG. 4. Thus, reference numerals used in FIG. 1A are common to reference numerals used in FIG. 1B, and objects mentioned in FIG. 1A correspond to the same objects used in FIG. 1B.

The testing data service (134) is a software program or an application-specific hardware, possibly acting as a communication layer in a computerized network. The testing data service (134) acts as a clearinghouse between other features of the system shown in FIG. 1A. In particular, a request for test data in a requested format is received from a remote computer (154). Typically, the remote computer (154) is operated by a programmer or other technician responsible for developing a new service or modifying an existing service in a larger enterprise environment. The service under development or modification may be for use on or in conjunction with the financial management application (138).

The FMA (138), in accordance with one or more embodiments, is a software application written in any programming language that includes instructions. The instructions, when executed by one or more processors, enable a device to perform functions described in accordance with one or more embodiments. In one or more embodiments, the FMA (138) is capable of assisting a user with the user's finances. For example, the FMA may be a tax program, a personal budgeting program, a small business financial program, or any other type of program that assists with finances. The FMA (138) may contain a user interface that allows for the user to interact with the FMA (138).

Returning to the testing data service (134), once the request for test data is received, the testing data service (134) verifies that the request is valid. If the request is valid, then the testing data service (134) schedules retrieval of the test data. The testing data service may also check to see if existing test data already exists in a desired format; if so, then the existing test data may be returned to the remote computer. Otherwise, the testing data services (134) transmits a request to an orchestration layer (136).

The orchestration layer (136) typically retrieves data that already exists in a variety of different sources. Thus, the orchestration layer queries data repository (100), which contains the sources of the desired data. The sources include domain data repository 1 (102), domain data repository 2 (104) (with hidden network dependency information), and domain data repository 3 (106). These sources may be contained physically within a single data repository (100) or may be distributed across the enterprise environment.

The orchestration layer (136) returns the desired data in the desired data structure to the testing data service (134). The testing data service (134) may verify that the test data and the format of the test data meet the conditions set by the user at the remote computer (154). If the test data and the format of the data are verified, then the testing data service (134) returns the test data to the remote computer (154). The user then uses the remote computer (154), or some other networked computer, to test the software service being developed or modified using returned data.

Figure 1B:
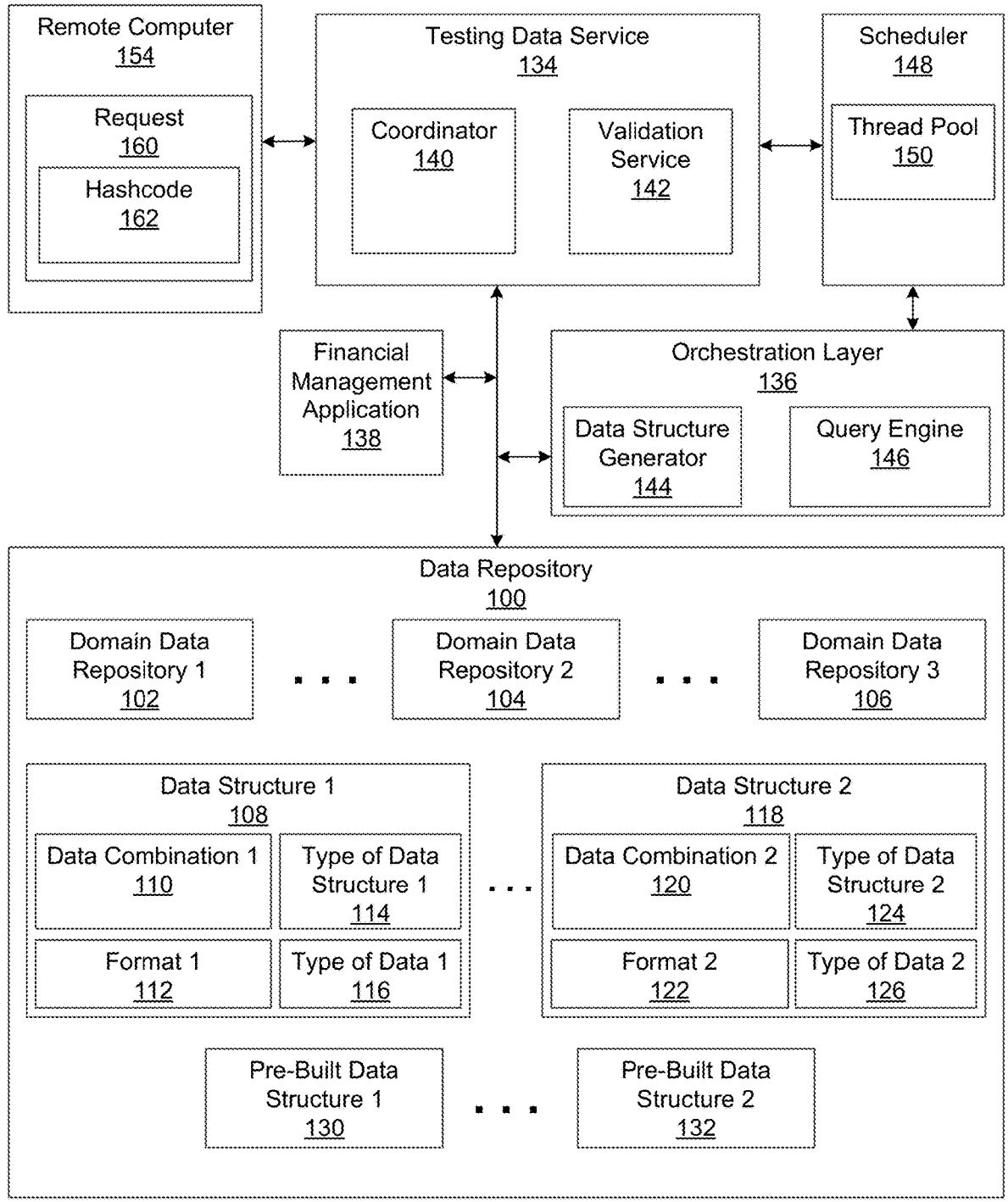

Attention is now turned to FIG. 1B, which depicts a schematic system diagram, in accordance with one or more embodiments. In accordance with one or more embodiments, a data repository (100) includes one or more domain data repositories, such as domain data repository 1 (102), domain data repository 2 (104), and domain data repository 3 (106). The data repository (100) also includes data structures, such as data structure 1 (108) and data structure 2 (118), and pre-built data structures, such as pre-built data structure 1 (130), and pre-built data structure 2 (132). Each of these components is defined in turn.

In one or more embodiments, the data repository (100) is configured to store data. The data repository (100) may take the form of non-persistent storage (e.g., volatile memory, such as random-access memory (RAM), cache memory), persistent storage (e.g., a hard disk, an optical drive such as a compact disk (CD) drive or digital versatile disk (DVD) drive, a flash memory, etc.), or a data repository (e.g., a hierarchical file system, a database, a database management system, etc.) as shown and described in relation to FIG. 5A.

Each of the three domain data repositories shown in FIG. 1B, such as domain data repository 1 (102), domain data repository 2 (104), and domain data repository 3 (106), are data repositories of the type know to those skilled in the art, often with data structures containing a source of data related to a domain of information (i.e., domain data). Domain data is data that relates to a specific field or type of information, such as financial constraints, user definitions, common user interface commands, etc. Examples of domain data can be, but it not limited to, data structure definitions for use with a variety of existing software programs in a computerized enterprise environment, data for use in populating the data structure definitions, and prior test data created in response to prior requests for test data for other software programs being developed. Although three domain data repositories are shown in FIG. 1B, more or fewer may be present.

Each of the data structures shown, including data structure 1 (108) and data structure 2 (118), are data structures used to store data in a form where the data is organized, secure, verifiable, and may be retrieved with relative ease. As used herein, data structure 1 (108) and data structure 2 (118) contain test data for use in testing software, such as the data in any of domain data repository 1 (102), domain data repository 2 (104), or domain data repository 2 (106).

Each data structure includes a number of elements or information related to the contents of the data structure. For example, data structure 1 (108) includes data combination 1 (110), format 1 (112), type of data structure 1 (114), and type of data 1 (116). In one or more embodiments, data combination 1 (110) is a combination of data obtained or taken from one or more of domain data repository 1 (102), domain data repository 2 (104), and/or domain data repository 3 (106). In one or more embodiments, format 1 (112) is the format of the data for data combination 1 (110). Examples of data formats may be text, audio, video, container, file, or many other types of formats. However, as used herein, format 1 (112) is defined for use with a specific software program being developed by a software developer. In one or more embodiments, a type of data structure 1 (114) is the type of the data structure defined for use with the specific software program being developed by the software developer. Examples of types of data structures include, but are not limited to, a vector, a matrix, a queue, a stack, a linked list, and a tree. In turn, the type of data 1 (116) is the type of data being requested for testing of the software program being developed by a software developer. Examples of the type of data may be data for a software program used in a larger enterprise environment, financial data, network data, or some other data in a data domain.

Data structure 2 (118) shares a similar structure relative to data structure 1 (108). Thus, data combination 2 (120), format 2 (122), type of data structure 2 (124), and type of data 2 (126) share common descriptions with the corresponding features in data structure 1 (108) but represent a different instance within data structure 2 (118).

In one or more embodiments, either or both of data structure 1 (108) or data structure 2 (118) contains data describing a virtual company as opposed to a brick and mortar company. In this case, the type of data 1 (116) or the type of data 2 (126) may be financial information regarding the virtual company.

The data repository (100) contains one or more pre-built data structures, such as pre-built data structure 1 (130) and pre-built data structure 2 (132). More or fewer pre-built data structures may be stored within a database (not shown) stored in data repository (100). The database (not shown) may take many different forms, including a relational database, a distributed database, an array database, an unstructured database, and many other types of databases.

Each of the pre-built data structures are similar to data structure 1 (108) and data structure 2 (118). However, pre-built data structure 1 (130) and pre-built data structure 2 (132) contain data structures that have previously been built for use as test data for other software programs at the request of users in the past. The pre-built data structures may be thought of as a library to be used, in part or in whole, as a resource for a testing data service. The pre-built data structures may be stored for easy retrieval when a determination is made that a pre-built data structure is useable with a new request. In one or more embodiments, a pre-built data structure may be partially used, or cannibalized, for use in generating one or both of data structure 1 (108) and data structure 2 (118).

Data repository (100) is in communication with several other features of the system of FIG. 1B, including a testing data service (134), an orchestration layer (136), and a financial management application (138). Each of these features is described in turn.

In one or more embodiments, testing data service (134) (sometimes referenced as a "TDS") is a software program or an application-specific hardware, possibly acting as a communication layer in a computerized network. The testing data service (134) acts as a clearinghouse between other features of the system shown in FIG. 1B.

In one or more embodiments, the TDS (134) includes a coordinator (140) and a validation service (142). In one or more embodiments, the coordinator (140) is software or application-specific hardware configured to coordinate requests for data structures, such as data structure 1 (108), data structure 2 (118), pre-built data structure 1 (130), and pre-built data structure 2 (132), as shown and described with respect to FIG. 2 and FIG. 3. "To coordinate", as used in one or more embodiments, means to determine the priority and timing of processing requests for data structures, and to communicate the requests for data structures among the various other features shown in the system of FIG. 1B.

The TDS (134) also includes a validation service (142). In one or more embodiments, the validation service (142) is software or application-specific hardware configured to validate whether a request for a data structure is proper, as shown and described with respect to FIG. 4.

The system of FIG. 1B also includes an orchestration layer (136), which is in communication with the data repository (100), the TDS (134), and the financial management application (138). In one or more embodiments, the orchestration layer (136) is software or application specific hardware configured to generate data structures, such as data structure 1 (108), data structure 2 (118), pre-built data structure 1 (130), and pre-built data structure 2 (132), as described and shown with respect to FIG. 2 and FIG. 3. In one or more embodiments, the orchestration layer (136) is also configured to populate the data structures with data combinations from the domain data repositories, as shown and described with respect to FIG. 2 and FIG. 3.

The orchestration layer (136) includes a data structure generator (144) and a query engine (146). In one or more embodiments, the query engine (146) is software or application specific-hardware configured to query the data repository (100) to obtain necessary data from various data sources, as shown and described with respect to FIG. 2 and FIG. 3. In one or more embodiments, the data structure generator (144) is software or application-specific hardware configured to generate data structures, such as data structure 1 (108), data structure 2 (118), pre-built data structure 1 (130), and pre-built data structure 2 (132), as shown and described with respect to FIG. 2 and FIG. 3.

In one or more embodiments, the financial management application (138) is software or application-specific hardware configured to manage the finances of a business or individual. The financial management application (138) may be a single software program or many software programs, operating in a local environment or over a wide area network (such as the Internet), which operate with each other in a distributed computing environment that forms a technological business enterprise. A technological business enterprise is a purely hardware or software arrangement of components that operate together to allow users to access computerized services either directly or over a network. In one or more embodiments, one use for the TDS (134) is to provide test data to be used in testing software being developed for any software program, including the financial management application (138). In this manner, test data is generated and provided in no time (i.e., in less than a millisecond) so that an entire suite of tests may be executed in a few minutes, rather than the lengthy times currently endured.

The system of FIG. 1B may also include a scheduler (148) in communication with the TDS (134) and the orchestration layer (136). In one or more embodiments, the scheduler (148) is configured to schedule requests for the data structures shown in the data repository (100), as described and shown with respect to FIG. 2 and FIG. 3.

Figure 3:
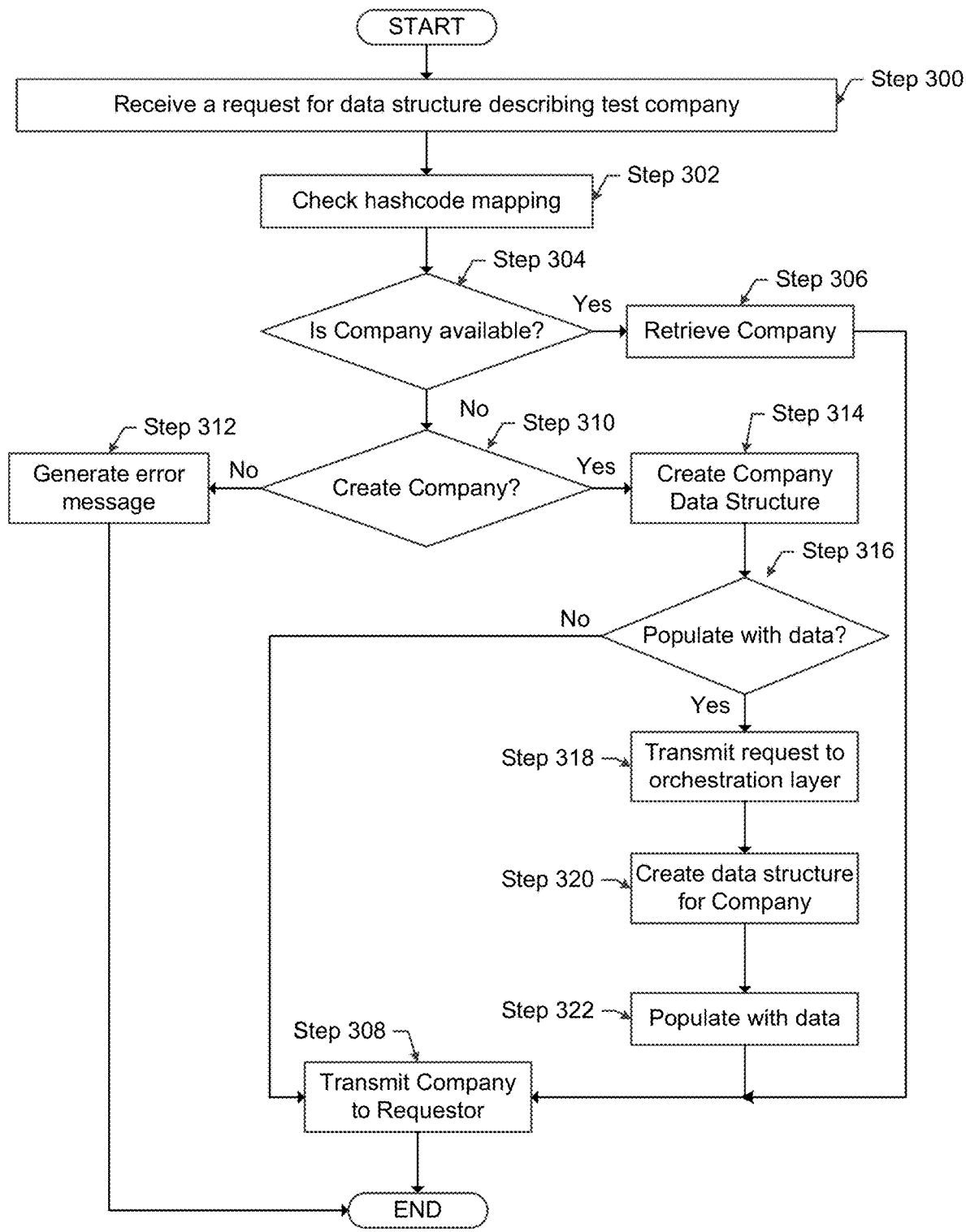

In one or more embodiments, the scheduler (148) includes a thread pool (150), which is used to schedule which requests are processed first, as shown and described with respect to FIG. 3. In one or more embodiments, the thread pool (150) is a software or hardware design pattern for achieving concurrency of execution in a computer program. Often also called replicated workers or a worker-crew model, a thread pool maintains multiple threads waiting for tasks to be allocated for concurrent execution by the supervising program, namely, the TDS (134).

Figure 5A:
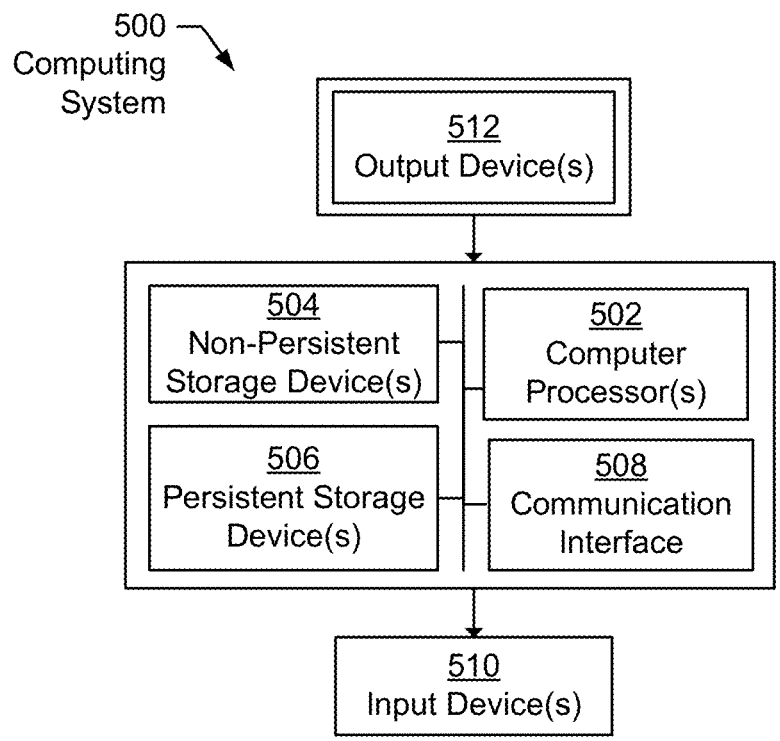
FIG. 5A and FIG. 5B depict diagrams showing a computing system, in accordance with one or more embodiments.
Figure 5B:
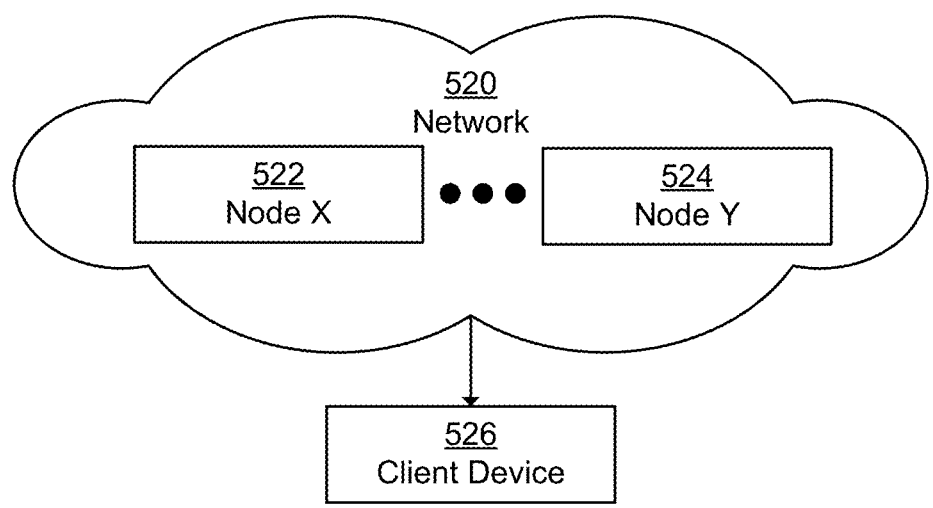

The features described above with respect to FIG. 1B may be managed by or executed by a server computer system (not shown). The server computer system (not shown) may be a combination of one or more computers, possibly operating in a networked environment. An example of a computer and a network is shown in FIG. 5A and FIG. 5B and described below.

The system of FIG. 1B may also include one or more remote computers, such as remote computer (154). The remote computers may communicate with the TDS (134), either directly or possibly through a server computer system. Used herein, the remote computer (154) describes the computers being used by software developers or engineers to develop software programs for which test data is being requested.

Thus, in accordance with one or more embodiments, the remote computer (154) generates a request (160), which is transmitted to the TDS (134) and prompts the TDS (134) to coordinate generation and delivery of a data structure having a data combination, as described above and with respect to FIG. 2 and FIG. 3. The request (160) may include a hashcode (162) useful for such things as identifying the data combination, the type of data structure, the format of the data structure, and the type of the data, as shown and described with respect to FIG. 2 and FIG. 3. In one or more embodiments, a hashcode (162) is a number generated from data. In the JAVA® programming language, every class implicitly or explicitly provides a hashcode method, which digests the data stored in an instance of the class into a single hash value (typically a 32-bit signed integer). The hash is used by other code when storing or manipulating the instance. Many types of hashcodes are contemplated for use with the one or more embodiments.

Figure 2:
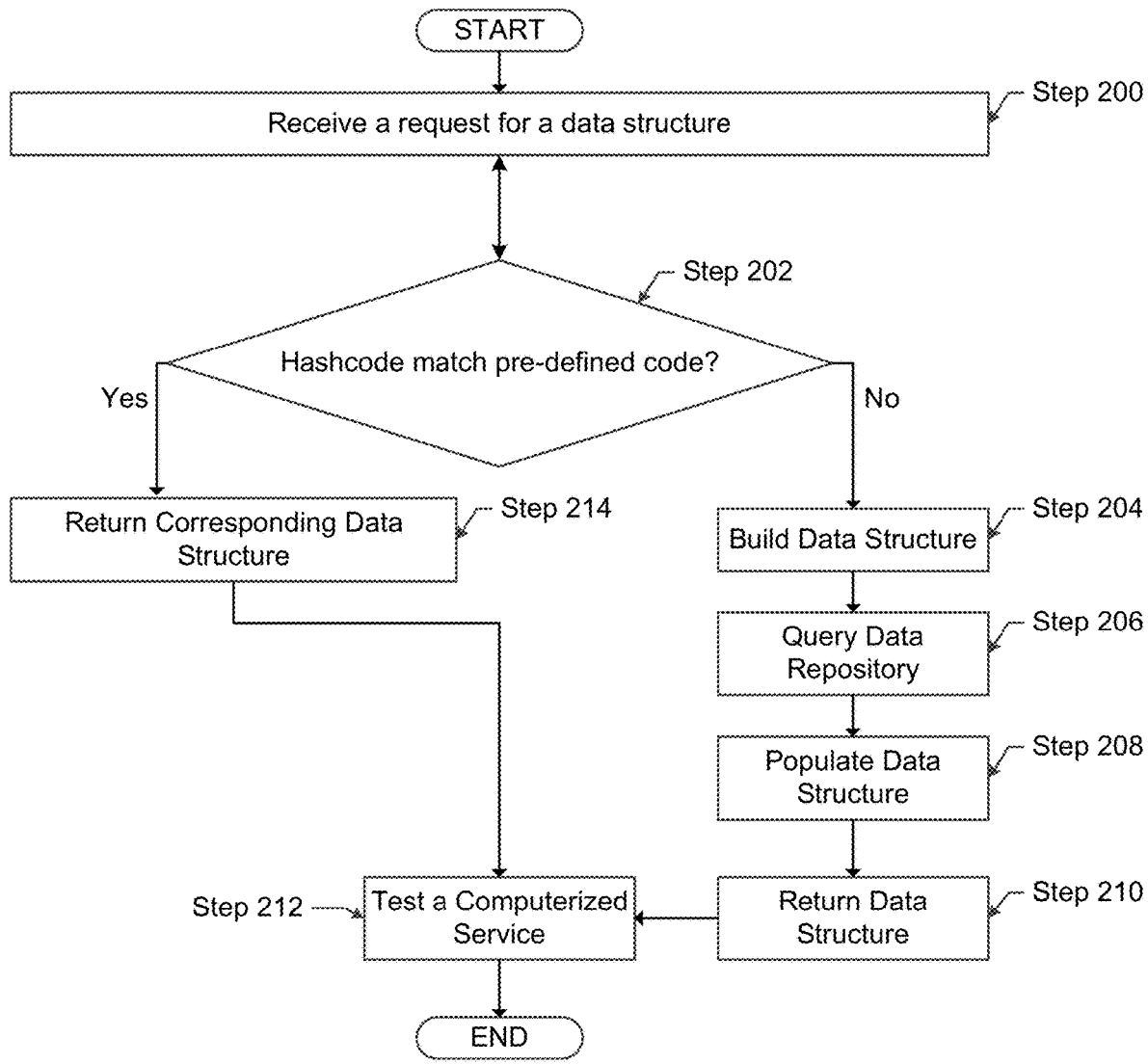
FIG. 2 and FIG. 3 depict flowchart diagrams, in accordance with one or more embodiments.

FIG. 2 and FIG. 3 depict flowchart diagrams, in accordance with one or more embodiments. The method shown in FIG. 2 may be implemented by a server computing system, such as a server computing system, or by computing system (500) shown and described in FIG. 5A, possibly operating in a network environment as shown and described in FIG. 5B.

In step (200), a request for a data structure is received. The request may be for a data structure including a data combination arranged in a format specified in the request. In one or more embodiments, the request includes a hashcode identifying the type of the data structure and the type of the data combination. The request may be generated by a remote computer, such as remote computer (154) of FIG. 1B, for the purpose of automatically generating test data for use in testing software programs being developed on the remote computer or, alternatively, on any computer that is involved in testing with the ability to send a request for a data structure.

In step (202), a determination is made whether the hashcode matches a pre-defined code. If not, then in step (204), a data structure is built or generated in the form required. The data structure is built or generated to have the type of the data structure specified in the request. The procedure for building the data structure is now described using at least steps 206, 208, and 210.

In step (206), a data repository is queried for the type of the data combination. In response to query, data is returned that includes the data combination. This returned data, in step (208), is used to populate the data structure.

In step (210), the populated data structure is returned. In particular, the data structure may be returned to a testing data service, which in turn transmits the returned data structure to the remote computer or remote computers which requested the data structure.

Thereafter, in step (212), a computerized service is tested under the supervision of a software developer or engineer. In one or more embodiments, the computerized service is tested using the returned data structure. The method of FIG. 2 may terminate thereafter.

In a non-limiting example, the returned data may describe financial information of a virtual company. Thus, the returned data structures may be used to test software being developed for inclusion in a financial management application that manages the finances of companies, including the virtual company described in the data of the returned data structure.

Returning to step (202), if the hashcode does match a pre-defined code, then a corresponding data structure is retrieved and returned (step 214). In one or more embodiments, the returned data structure may be a pre-built data structure (stored in a library of previously generated data structures) having a pre-populated data combination. Thereafter, the method of FIG. 2 proceeds to step (212) where a computerized service is tested under the supervision of a software developer or engineer using the returned data structure, as described above. The method of FIG. 2 may terminate thereafter.

The method shown in FIG. 2 may be varied. For example, after returning the data structure, the data structure may be stored in a storage device for later use. Additionally, a new hashcode may be associated with the data structure so that the testing data service can quickly identify the newly stored data structure from among other pre-existing data structures.

In another example, prior to building the data structure, a notice can be transmitted to the remote computer that a request to build the data structure has been received. In this manner, the user at the remote computer knows that the request is being processed. Thereafter, the method of FIG. 2 may also include functionality for scheduling generation of the data structure in a thread pool that schedules creation of multiple data structures.

Attention is now turned to FIG. 3, which is a specific example of the method shown in FIG. 2. The method shown in FIG. 3 may be implemented by a server computing system, or by the computing system (500) of FIG. 5A, possibly operating in a network environment as shown in FIG. 5B.

In step (300), a request is received for a data structure describing a test company. In this example, the request is received at a testing data service executing on a server computer system. Further, the request is received from a remote computer operated by a user who is developing software for use in a financial management application. The user desires to test the software that has been developed.

As it turns out, the user does not have access to the live data stored in the financial management application, and for a variety of reasons (often including security and privacy) is not allowed to have access to the data. In this specific example, the financial management application is being used by operating companies that require their data to be kept private and secure. Thus, while nominally, the user could test the software application using real (or live) data, the user cannot adequately access this data. Thus, unless the user develops his or her own test data, the user is unable to adequately or efficiently test the software. Because developing special test data for a software program is laborious, the user turns to the testing data service as a technical solution for automatically providing the specific kind of test data needed to test the software program under development, in the data format and data structure needed by the user.

In step (302), a hashcode mapping is checked (step 302), using the hashcode stored as part of the request sent to the TDS, as described above with respect to FIG. 2 and FIG. 1B. The hashcode mapping is used to determine if a pre-existing data structure having data describing a company is present in the storage device of the system (as a pre-built data structure or other data structure). The hashcode may also be used to designate the type of data structure, the format of the data structure, the type of data, and the data combination (if any) to be included in the data structure that is to be returned.

As an alternative to a hashcode mapping, some other reference could be used. For example, a billing code could be used in place of the hashcode. The billing code may designate the type of access to the overall enterprise system that is required in order to access the software program that is under development. The level of access may drive the type of data structure, the format of the data structure, the type of data, and the data combination (if any) to be included in the data structure that is to be returned.

In step (304), a determination is made whether a company is available. A company is available if a data structure, possibly containing data, that describes a computerized description of a company is currently stored in the system, for example, in a storage device.

If a company is available, then in step (306) the company is retrieved. In step (308), the company is then transmitted to the requestor. Preferably, the company is transmitted through a TDS, such as the testing data service (134) shown in FIG. 1B according to the process described and shown with respect to FIG. 2. The method of FIG. 3 may terminate thereafter.

Returning to step (304), if the company is not available, then in step (310), a determination is made whether to create the company (i.e., create the data structure, and possibly the data combination therein, that provides a computerized description of a company). If not, then in step (312) an error message is generated. The error message may be transmitted to the remote user who requested the company. The method of FIG. 3 may terminate thereafter.

However, if the company is available at step (310), then in step (314), the data structure describing the company is created. The data structure describing the company is created by creating the data structure of the type requested by the user via the hashcode. In other words, in this example, the company is the data structure.

In step (316), a determination is made whether to populate the company with data. If not, then the method returns to step (308), the company is transmitted to the requestor, and the method terminates.

If yes at step (316), then in step (318) the request is transmitted to an orchestration layer. The orchestration layer may be orchestration layer (136) of FIG. 1B, which operates as shown described with respect to FIG. 2. In step (320), if desirable, the orchestration layer may modify the data structure that describes the company. In step (322), the orchestration layer populates the company with data. The data in this example is financial information which describes the company. The financial information is of a type to be used by the software program under development. The method then proceeds to step (308), in which the company is transmitted to the requestor. The method of FIG. 3 then terminates.

Figure 4:
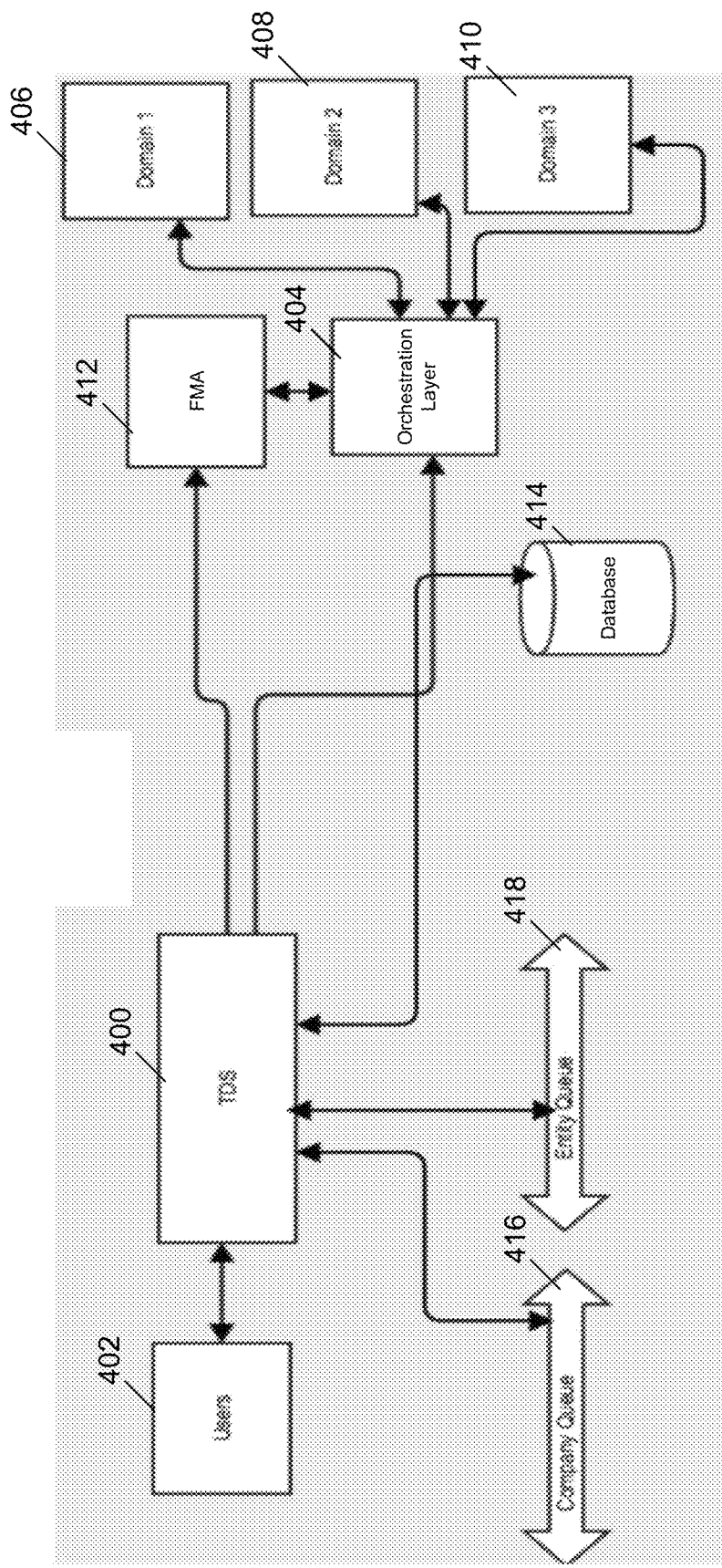
FIG. 4 depicts an example of flow diagram for providing test data as a service, in accordance with one or more embodiments.

FIG. 4 shows an example of a flow diagram for providing test data as a service, in accordance with one or more embodiments. The diagram shown in FIG. 4 is a variation of one possible implementation of the system shown in FIG. 1B and may be used to implement the methods shown in FIG. 2 and FIG. 3.

As shown in FIG. 4, the TDS (400) is a testing data service. In one or more embodiments, the TDS (400) receives requests from users (402) for data structures containing data, with the data structures and data being specific to the software programs the software developer or engineer are developing and attempting to test. The TDS (400) communicates with the orchestration layer (404), which includes computer functionality for retrieving the necessary data from the data domains, such as domain 1 (406), domain 2 (408), and domain 3 (410). The orchestration layer (404) may also communicate with the financial management application (FMA) (412) to retrieve either data structures or data from operating companies.

In an embodiment, the orchestration layer (404) may scrub proprietary data from the FMA (412) or the domains. Thus, in one or more embodiments, the orchestration layer (404) and the TDS (400) may serve to enhance computer security and privacy while still allowing developers to test their software programs developed for the FMA (412).

Additionally, the TDS (400) may communicate with a database (414). The database (414) may contain pre-built data structures for retrieval by the TDS (400) when requested by the users (402). In this manner, the TDS (400) not only enables the retrieval of the requested data and data structures, but also increases the speed at which the network system can retrieve the requested data.

Still further, the TDS (400) may communicate with company queue (416) and entity queue (418). The two queues schedule the requests for data structures and data from the users (402), allowing the TDS (400) to coordinate many requests across a distributed computing environment. Thus, the one or more embodiments also may provide a technical benefit of maximizing the speed and efficiency of communication in a network environment, and also increase the speed of software development. In turn, the operation of the FMA (412) in a computing environment is enhanced in terms of its functionality and capabilities through the addition of fully tested and secure software developed by the users (402).

In summary, the one or more embodiments provide for a testing data service useful for automatically providing desired data structures populated with desired data for use in testing new software being developed for use in a larger online enterprise. The software may be designed to plug into one or more larger, existing software programs executing on a server as an online service. Because the new software plug-in is designed for use with the existing software, the new software may require data in a format and of a type which is expected to be used with the larger software program. Such test data may be difficult to obtain, particularly in the context of a specific enterprise environment. However, testing of the new software may be considered important, possibly necessary, before integration with the larger program.

In a non-limiting, specific use-case example, a financial management application (FMA) executes on one or more servers in a distributed computing environment. A software developer or engineer creates a new plug-in for the FMA to perform a specific function, such as to create automated ledgers from data provided by customers to the FMA. However, prior to integration of the plug-in with the FMA, or allowing the plug-in to otherwise interact with the FMA, the software developer or engineer is required by their employer to test the plug-in.

The software developer or engineer, due to privacy concerns, is not allowed to access existing financial data in the FMA. Alternatively, or perhaps in addition, the existing financial data in the FMA is not in the correct data format. Alternatively, or perhaps in addition, the existing financial data does not include types of data the plug-in uses, such as when the plug-in will provide new capabilities for tracking finances using the FMA.

Attention is now turned to a description of the one or more embodiments. This description uses the components shown and described in FIG. 1B and FIG. 4 and elaborates on possible implementation schemes and technique. The description below should not limit the component, but rather provide additional or alternative functionality of the component.

Integration testing of software to be inserted into an ongoing computerized enterprise takes a lot of time, and very often tests fails in the pre-condition steps. At these steps, software engineers can become frustrated and may resort to undesirable programming tweaks to reach the degree of program implementation where the software could be tested and executed.

Test Data as a Service (TDS) provides software engineers an option by which test data can be created and provided in very little time. Thus, the one or more embodiments allow many tests to be executed in a few minutes, thereby increasing the speed at which software builds could be certified. The one or more embodiments are specifically useful for generating virtual companies, which are specific data structures that may contain massaged (or manipulated) data. Note that in some cases, the data structure alone is all that is needed or desired to test software under development; thus, it is not always necessary for the data structure to include data.

The TDS may be implemented using V4 SDK (software development kit), an identity service, and an orchestration layer. Services and databases, such as AMAZON® SIMPLE QUEUE SERVICE®, an AMAZON® WEB SERVICE® code Pipeline, and MYSQL® database, may be used for a technical stack. Companies can be pre-created with the data populated and stored in a database for unique or repeated requests. Since the orchestration layer coordinates data structure generation and data population across an enterprise, any type of company or data structure with different combinations of data could be created. Thus, the one or more embodiments allow for creation of a unique set of test data with data massaged (or manipulated) and ready, so that tests need to bother only about verification steps.

When new requests come in for companies with a specific data combination, the request may be validated. If the test request is valid, requests are processed using tools such as AMAZON® SIMPLE QUERY SERVICE® engines and finally stored in a TDS database.

Subsequent request patterns for companies (data structures) are served from the TDS database, instead of calling the orchestration layer. Schedulers, using tools such as Spring Boot, ensure that the requests have ample data available in the testing data service. Thus, the testing data service acts as a mask between the caller (software engineer) and end points in the enterprise environment by which the software engineer can get entities served out with data pre-created without the tester needing to bother about preconditions. Because the testing data service may be hosted using V4 SDK, the testing data service may support REST (representational state transfer), GRAPH QL® APIs (application programming interfaces), and BATCH projections (changes to the coordinate system of a set of input feature classes or feature datasets, including the datum or spheroid).

Again, the testing data service may be built using such tools as SPRING BOOT® and V4 SDK. A user who wants to write tests in an online enterprise would likely want an entity which is populated with data combinations. The one or more embodiments take the request and use an orchestration layer service across domains in the enterprise environment to validate whether the test request is a valid one by firing just once. If the request is found valid, a response is sent back to the caller client with a successfully created entity. At the same time, a thread pool is fired, which will dump requests onto tools such as AMAZON® SIMPLE QUERY SERVICE® engines for entity creation.

From the queues, tools such as AMAZON® WEB SERVICE® instances poll using a SPRING BOOT® scheduler to get the requests. The entity is created with data and stored a data storage. Subsequent requests from the caller may be served from the database instead of calling all the domains at run time. As a result, the request may be served in less than 1 second.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 5A. Further, the client device (626) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). When a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for software development, comprising:
   a storage device configured to store a plurality of domain data repositories across an enterprise environment, wherein:
      the plurality of domain data repositories comprise different domains of information representing different types of information, including a type of information, and further comprise a plurality of different formats of data structures, including a format of a data structure, wherein the format defines a type of the data structure;
   a testing data service, in communication with the storage device, configured to:
      receive, from a remote computer in the enterprise environment, a request for a data structure comprising a data combination arranged in the format, wherein the format is specified in the request;
      transmit the request together with a hashcode mapping in the request;
      receive a generated data structure comprising the format and further comprising a generated data combination of the type of information; and
      transmit the generated data structure to the remote computer; and
   an orchestration layer, in communication with the testing data service, comprising:
      a query engine configured to receive the request from the testing data service and check the hashcode mapping to determine the format of the data structure; and
      a data structure generator configured to build the generated data structure to have the format determined using the hashcode mapping and to populate the generated data structure with the type of information received from the query engine,
      wherein the orchestration layer is further configured to transmit the generated data structure to the testing data service.

2. The system of claim 1, wherein the types of information are defined as data specifying a pre-selected domain of information.

3. The system of claim 2,
   wherein the pre-selected domain of information comprises an electronic description of a virtual company, and
   wherein the format of the data structure is configured for use in a software service, executable on the remote computer, which uses the electronic description while executing the software service.

4. The system of claim 1, further comprising:
   a scheduler, comprising a thread pool, in communication with the testing data service, the scheduler configured to schedule building of a plurality of data structures by the orchestration layer, including building of the generated data structure.

5. The system of claim 1,
   wherein the testing data service further comprises:
      a validation service configured to validate the request prior to being transmitted to the orchestration layer, and
   wherein the testing data service is configured to, responsive to the request failing a validation check, return an error to the remote computer.

6. The system of claim 1, wherein the testing data service further comprises:
   a coordinator configured to coordinate a plurality of requests for a corresponding plurality of data structures from a plurality of different remote computers.

7. The system of claim 1, wherein the testing data service is further configured to:
   prior to transmitting the request to the orchestration layer, check whether any of a plurality of pre-existing data structures stored on the storage device correspond to the hashcode; and
   responsive to the hashcode corresponding to one of the pre-existing plurality of data structures, return to the remote computer the one of the pre-existing plurality of data structures.

8. The system of claim 1, further comprising:
   a financial management application executable on a computer processor, the financial management application storing financial information for use as the type of information.

9. A method executed in an enterprise environment comprising a plurality of networked computers, the method comprising:
   receiving a request for a data structure comprising a type of information arranged in a format specified in the request, wherein the format comprises a type of the data structure;
   coordinating the request with a plurality of additional requests, in the enterprise environment, for a plurality of additional data structures, wherein coordinating comprises scheduling building of the data structure in a thread pool that schedules creation of the data structure and the plurality of additional data structures in the enterprise environment;
   querying a data repository for the type of information;
   querying the data repository using a hashcode mapping to determine the format of the data structure;

receiving, in response to querying, returned data comprising the type of information and the format of the data structure;

populating the data structure with the returned data;

returning the returned data structure; and testing, using the returned data structure, a computerized service.

10. The method of claim 9, wherein the type of information is defined as data specifying a pre-selected domain of information.

11. The method of claim 10, wherein the pre-selected domain of information comprises an electronic description of a virtual company, and wherein the format of the data structure is configured for use in a software service, executable on a remote computer, which uses the electronic description while executing the software service.

12. The method of claim 9, wherein the data structure comprises a description of a virtual company and the type of information comprises financial information regarding the virtual company.

13. The method of claim 9, wherein the computerized service is configured to manipulate financial information of a plurality of companies.

14. The method of claim 9, further comprising:

responsive to the hashcode mapping failing to match a pre-defined code, building the data structure comprising the format of the data structure specified in the request;

responsive to the hashcode mapping matching the pre-defined code, returning a pre-existing data structure matching the pre-defined code.

15. The method of claim 9, wherein the method further comprises:

responsive to the hashcode failing to match a pre-defined code, building the data structure to have the type of data structure specified in the request;

storing, after returning the data structure, the data structure in a storage device; and associating the data structure with the hashcode.

16. The method of claim 15, further comprising:

prior to building the data structure, transmitting a notice to the remote computer that a request to build the data structure is received.

17. A non-transitory computer readable medium comprising instructions which, when executed by a computer processor, perform:

receiving a request for a data structure comprising a data combination arranged in a format specified in the request, the request comprising a hashcode identifying a format of the data structure and the request further comprising a specification of a type of information for the data combination, wherein the format defines a type of the data structure;

responsive to the hashcode failing to match a pre-defined code, building the data structure to have the type of the data structure specified in the request;

querying a data repository for the type of information;

receiving, in response to querying, returned data comprising the type of information;

populating the data structure with the returned data;

returning the returned data structure; and testing, using the returned data structure, a computerized service.

18. The non-transitory computer readable medium of claim 17, wherein the type of information is defined as data specifying a pre-selected domain of information.

19. The non-transitory computer readable medium of claim 18, wherein the pre-selected domain of information comprises an electronic description of a virtual company, and wherein the format of the data structure is configured for use in a software service, executable on the remote computer, which uses the electronic description while executing the software service.

20. The non-transitory computer readable medium of claim 17, wherein the data structure comprises a description of a virtual company and the type of information comprises financial information regarding the virtual company.

21. The non-transitory computer readable medium of claim 17, wherein the computerized service is configured to manipulate financial information of a plurality of companies.

22. The computer program product of claim 21, wherein instructions which, when executed by a computer processor, perform:

prior to building the data structure, transmitting a notice to the remote computer that a request to build the data structure is received; and scheduling building of the data structure in a thread pool that schedules creation of a plurality of data structures.

23. The non-transitory computer readable medium of claim 17, wherein instructions which, when executed by a computer processor, perform:

responsive to the hashcode matching the pre-defined code, returning a pre-existing data structure matching the pre-defined code, wherein the pre-existing data structure is used as the data structure.

24. The computer program product of claim 17, wherein instructions which, when executed by a computer processor, perform, after returning the data structure:

storing the data structure in a storage device; and associating the data structure with the hashcode.

* * * * *